O. Du BOIS.
Track Clearers for Harvesters.
No. 6,201. Reissued Jan. 5, 1875.
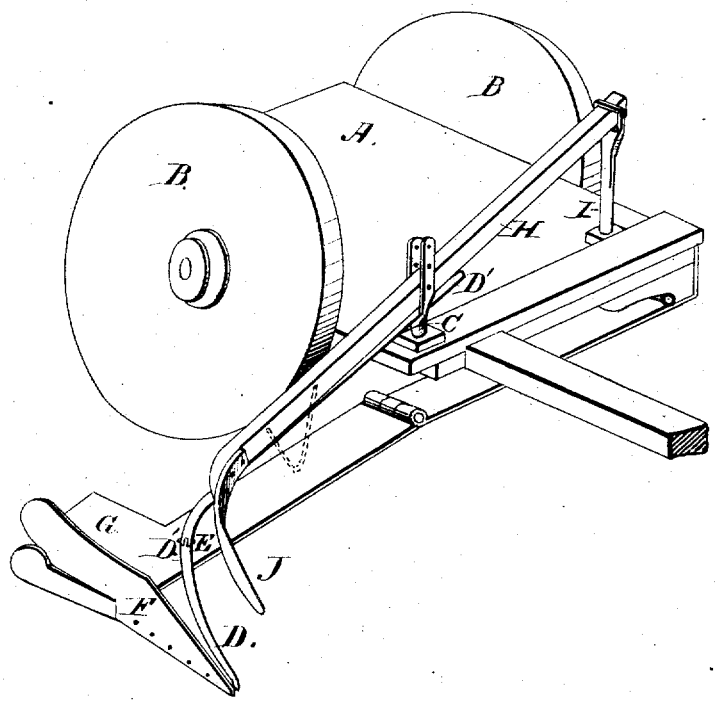
Witnesses;
Harry C. Clark
H. E. Matthews.
Inventor.
Orin Du Bois
By H. W. Beadle & Co.
Attys.
THE GRAPHIC CO. PHOTO-LITH. 39 & 41 PARK PLACE, N.Y.

UNITED STATES PATENT OFFICE.

ORIN DU BOIS, OF SAN JOSÉ, CALIFORNIA.

IMPROVEMENT IN TRACK-CLEARERS FOR HARVESTERS.

Specification forming part of Letters Patent No. 137,351, dated April 1, 1873; reissue No. 6,201, dated January 5, 1875; application filed June 29, 1874.

*To all whom it may concern:*

Be it known that I, ORIN DU BOIS, of San José, Santa Clara county, State of California, have invented an Attachment for Mowing-Machines; and I do hereby declare the following description and accompanying drawings are sufficient to enable any person skilled in the art or science to which it most nearly appertains to make and use my said invention without further invention or experiment.

The object of my invention is to provide a novel attachment for mowing-machines and other similar machines; and it consists mainly in the employment of a curved finger or arm, which extends diagonally over the cutters, and, by its peculiar position, causes the cut grass or grain to fall away from the standing grass or grain and lie at an angle. It further consists in the use of an additional device at the end of the cutter-bar, by which this object is more fully accomplished.

Referring to the accompanying drawings for a more complete explanation of my invention, the figure is a perspective view.

A represents a mowing-machine embodying my invention, and mounted on the wheels B B. A standard, C, is secured upon the platform in front of the driving-gears, in which a curved arm or finger, H, is placed, its opposite end resting in the mortise of the supporting end standard I. This sweep H is an important part of my invention, and is adjustable vertically by means of the pin and holes in the standard C and the screw-threads on both the standards, which screw into the frame A of the machine, and lie nearly on an angular line with the bar D′, in which case that portion of the bar or rod D′ might be dispensed with above the joint E, especially when tall grass is to be cut. At the outer end of the cutter-bar, and secured to the shoe, is a curved metal plate, F, the front edge of which is inclined, as shown, and is made sharp, as will be hereafter described. A sort of housing, G, is secured to this plate, and projects a short distance over the end of the cutter-bar, following the line of the bar D, where it curves down to the shoe.

The operation will be as follows: The point of the shoe and the bar D will enter between the standing grain or grass and separate off that portion which is to be cut, while the angle of the bar D inclines it away from the division-line below, and the curved finger or arm H receives it about midway, along which it is carried, so that, when the knives cut it, it will fall behind the knives when placed at the rear of the machine, and lie at an angle, with the heads away from the standing grain and the butt ends toward it.

By this device the grass or grain is laid regularly, so that it might be raked and bound, if desired.

The cut grass or grain being laid clearly away from the standing grass or grain, the machine, when it comes around again, will not cut off the heads of the grain in the previous swath, or be clogged by them.

By means of the plate F and housing G any grass which is much inclined, so as to pass under the bar D, will also be turned away from the standing grass, and the division line will also be more completely made.

The front edge of the plate F, being sharp, will cut any vines, burr, clover, or tangled grass, which would otherwise clog the machine, and for this purpose must be made long enough to cut it before the inner ends are cut by the knives.

By this means I am enabled to run the machine with a very great saving in labor, and also in power, as by the peculiar bending forward of the grass, and especially mustard-stalks, the cut is made much easier, and there is no liability to clog by lodged grass.

Having thus described my invention, what I claim, and desire to secure by Letters Patent, is—

1. In a mowing or reaping machine, the arm or finger H, made adjustable by means of the standards C and I, substantially as described.

2. The sharp-edged dividing or separating plate F, with its housing G, in combination with the rod D, substantially as and for the purpose above described.

In witness whereof I have hereunto set my hand and seal.

ORIN DU BOIS. [L. S.]

Witnesses:
C. W. M. SMITH,
E. V. SUTTER.